Patented June 28, 1949

2,474,779

UNITED STATES PATENT OFFICE 2,474,779

AZO COMPOUNDS FROM 1-DI-n-BUTYL-AMINO-2-NITRO-BUTANE

Edward F. Degering, La Fayette, Ind., and Gerhard van Biema, Jackson Heights, N. Y., assignors to Purdue Research Foundation, La Fayette, Ind., a corporation of Indiana No Drawing. Application August 17, 1945, Serial No. 611,263

6 Claims. (Cl. 260—193)

1

The present invention relates to new nitroazo compounds and to a method for preparing them. More particularly it relates to nitroazo compounds having the following general formula:

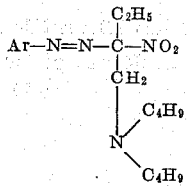

wherein Ar is an aromatic radical selected from the group consisting of β-naphthyl and p-chlorophenyl. The nitroazo compounds which are included within the scope of the above formula are: 1-di - n - butylamino - 2 - nitro - 2(β - naphthylazo)-butane; and 1-di-n-butylamino-2-nitro-2(4-chlorophenylazo)-butane.

In practicing our invention compounds of the type illustrated in the formula above are prepared by coupling the diazotized aromatic amines described with 1-di-n-butylamino-2-nitrobutane in acid solution. The aromatic amine is diazotized in acid solution and the 1-di-n-butylamino-2-nitrobutene is also dissolved in an acid solution such as hydrochloric acid and the two solutions are combined for coupling. The 1-di-n-butylamino-2-nitrobutane used in our process can be prepared as described in the Master's Thesis of Robert Edward Meeker, dated August, 1942, entitled "Condensation reactions of amines, formaldehyde and nitroparaffins," Purdue University, La Fayette, Indiana.

The 1-di-n-butylamino-2-nitrobutane though apparently generally unreacting with respect to coupling with most diazotized aromatic amines, couples readily in strongly acid solutions preferably having a pH below about 4 to produce brilliantly colored dyestuffs when reacted with aryl amines of the type of β-naphthyl-amines and of para-chloroaniline. These dyestuffs are useful in the dyeing of silk, wool, and rayon textiles to produce colored shades in the orange and yellow range.

The following specific examples will further illustrate our invention:

EXAMPLE I

*Preparation of 1-di-n-butylamino-2-nitro-2-(β-naphthylazo) butane*

A quantity of 3.6 parts of β-naphthylamines was dissolved in 15 parts of concentrated hydrochloric acid (specific gravity 1.19) and 20 parts of water. A solution of 1.88 parts of sodium nitrite in about 30 parts of water was then added with constant stirring. Stirring was continued for about ten minutes after the addition. A large excess of the nitroamine was needed to obtain coupling of this particular compound, and, accordingly 18 parts of 1-di-n-butylamino-2-nitrobutane was dissolved in about ten parts of concentrated hydrochloric acid solution (specific gravity 1.19) and 30 parts of water. This solution was poured into a solution of the diazonium compound. After stirring for a few minutes, a red-orange precipitate appeared which was filtered off and dried to yield about 1 part of a brick red solid. Two successive recrystallizations from 300 parts of 50% ethanol yielded 0.5 part of a red amorphous solid melting at 128.5° C. Corrected 130.8° C. Analysis for nitrogen 14.3 found and 14.58 theoretical. The yield was 17% of theory.

EXAMPLE II

*Preparation of 1-di-n-butylamino-2-nitro-2(4-chlorophenylazo) butane*

A quantity of 3.18 parts of para-chloroaniline was dissolved in 15 parts of concentrated hydrochloric acid (specific gravity 1.19) and 20 parts of water. A solution of 1.88 parts sodium nitrite in about 30 parts of water was then added dropwise with constant stirring. Upon termination of the addition the stirring was continued for about ten more minutes. A previously prepared solution of 11.6 parts of 1-di-n-butylamino-2-nitrobutane in 15 parts of concentrated hydrochloric acid (specific gravity 1.19) and 40 parts of water was then poured into the diazonium solution. The reaction mixture was warmed slightly on the steam bath with constant stirring until it had reached a temperature of about 30° C. The solution turned orange in color and an orange precipitate was formed. After ten minutes of further stirring the precipitate was filtered off, dried in a vacuum desiccator and weighed. A quantity of 0.9 part of the crude material was obtained. This was recrystallized from about 200 parts of 50% ethanol resulting in 0.6 part of bright orange needles melting at 108.5° C. Corrected 109.9° C. Analysis for nitrogen: Found 15.2. Theoretical 15.2.

Although the above describes the preferred embodiments of our invention it will be understood that departures may be made therefrom within the scope of the specification and claims.

What is claimed is:

1. Nitroazo compounds having the following structural formula:

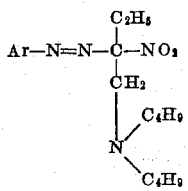

wherein Ar is an aromatic nucleus selected from the group consisting of β-naphthyl and para-chlorophenyl.

2. A process for preparing nitroazo compounds of the following structural formula:

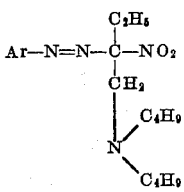

wherein Ar is an aromatic nucleus selected from the group consisting of β-naphthyl and para-chlorophenyl which comprises coupling a diazotized aromatic amine selected from the group consisting of β-naphthylamine and para-chloroaniline with 1-di-n-butylamino-2-nitrobutane in an acid solution having a pH below about 4.

3. 1-di-n-butylamino - 2 - nitro(β - naphthylazo)-butane.

4. 1-di-n-butylamino - 2 - nitro - (4 - chlorophenylazo)-butane.

5. A process for preparing 1-di-n-butylamino-2-nitro(β-naphthylazo)-butane which comprises coupling diazotized β-naphthylamine with 1-di-n-butylamino-2-nitrobutane in acid solution having a pH below about 4.

6. A process for preparing 1-di-n-butylamino-2-nitro(4-chlorophenylazo)-butane which comprises coupling diazotized para-chloroaniline with 1-di-n-butylamino-2-nitrobutane in acid solution having a pH below about 4.

EDWARD F. DEGERING.
GERHARD van BIEMA.

REFERENCES CITED

The following references are of record in the file of this patent:

UNITED STATES PATENTS

| Number | Name | Date |
| --- | --- | --- |
| 2,057,455 | Stenger | Oct. 13, 1936 |
| 2,392,611 | Nygaard | Jan. 8, 1946 |

OTHER REFERENCES

Feasley et al. in Journ. of Organic Chemistry 1943, vol. 8, pages 12–16. (Copy in Patent Office Library.)